(12) United States Patent
Leung

(10) Patent No.: US 6,957,727 B2
(45) Date of Patent: Oct. 25, 2005

(54) IMPACT ABSORBER FOR VEHICLE

(76) Inventor: Kam Hang Leung, Room 1506, 15th Floor Phase 1, Chai Wan Industrial City, 60 Wing Tai Road, Chai Wan (HK)

(*) Notice: Subject to any disclaimer, the term of this patent is extended or adjusted under 35 U.S.C. 154(b) by 0 days.

(21) Appl. No.: 10/640,009

(22) Filed: Aug. 14, 2003

(65) Prior Publication Data
US 2005/0189187 A1 Sep. 1, 2005

(30) Foreign Application Priority Data
Dec. 18, 2002 (HK) ................. 02109163.0

(51) Int. Cl.⁷ ................................. F16F 7/12
(52) U.S. Cl. ............. 188/371; 188/129; 188/268; 188/381; 267/139; 267/141; 267/153; 293/133; 280/777; 74/492
(58) Field of Search ................. 267/139–140, 267/134–135, 196–216, 141, 153, 292–294; 74/492–493; 280/777; 188/371–377, 129, 381, 268, 67; 293/133, 132; 213/22–39, 220–221, 40 R, 213/44; 464/167, 179, 180, 162, 183; 403/2

(56) References Cited

U.S. PATENT DOCUMENTS

| | | | |
|---|---|---|---|
| 2,819,063 A * | 1/1958 | Neidhart ................... 267/292 |
| 3,382,955 A * | 5/1968 | Deyerling ................. 188/129 |
| 3,392,599 A | 7/1968 | White | |
| 3,432,200 A * | 3/1969 | Barton ...................... 293/122 |
| 3,583,530 A | 6/1971 | De Venne | |
| 3,696,891 A * | 10/1972 | Poe ........................... 188/268 |
| 3,718,326 A * | 2/1973 | Ristau ....................... 267/140 |
| 3,740,045 A * | 6/1973 | Westmoreland ......... 269/162 |
| 3,788,148 A | 1/1974 | Connell et al. | |
| 3,815,438 A * | 6/1974 | Johnson ..................... 74/492 |
| 3,820,634 A * | 6/1974 | Poe ............................ 188/268 |
| 3,899,047 A | 8/1975 | Maeda et al. | |
| 3,997,208 A | 12/1976 | Nomiyama | |
| 4,006,647 A | 2/1977 | Oonuma et al. | |
| 4,136,787 A * | 1/1979 | Forster et al. ........... 213/40 R |
| 4,509,386 A * | 4/1985 | Kimberlin ................. 74/492 |
| 4,867,003 A * | 9/1989 | Beauch et al. ............ 74/492 |
| 5,228,720 A * | 7/1993 | Sato et al. ................ 280/777 |
| 5,407,239 A | 4/1995 | Arai et al. | |
| 5,597,055 A * | 1/1997 | Han et al. ................ 188/371 |
| 5,984,354 A | 11/1999 | Kim | |
| 6,672,575 B2 * | 1/2004 | Flower et al. ............ 267/205 |
| 2002/0157494 A1 * | 10/2002 | Matsumoto et al. ........ 74/492 |

FOREIGN PATENT DOCUMENTS

| | | |
|---|---|---|
| CN | 1258613 A | 7/2000 |
| EP | 0 130 463 | 1/1985 |

* cited by examiner

Primary Examiner—Douglas C. Butler
(74) Attorney, Agent, or Firm—Leydig, Voit & Mayer, Ltd.

(57) ABSTRACT

An impact absorber for a vehicle includes an outer body including a cavity having an axis, and an inner body situated partially within the cavity for relative movement into the cavity when the absorber is subjected to an impact. The inner body has at least one lateral protrusion. A number of deformable units are located in the outer body at different positions along the cavity. The deformable units partially protrude into the cavity for successive engagements and deformations, one unit after another unit, along the cavity, by the protrusion of the inner body moving into the outer body, thereby absorbing the energy of an impact in different stages. Each deformable unit includes a rigid ball protruding into the cavity and a deformable plate fixed behind the ball.

15 Claims, 5 Drawing Sheets

IMPACT ABSORBER FOR VEHICLE

The present invention relates to an impact absorber for use in a motor vehicle and, particularly, but not exclusively, in a bumper thereof.

BACKGROUND OF THE INVENTION

Impart energy absorbing apparatus for motor vehicles are known, for example as disclosed in U.S. Pat. Nos. 3,392,599, 3,788,148, 4,006,647 and 5,984,354. Such apparatus, which are intended for use in the steering shaft of a vehicle, comprise a shaft enclosed by an outer cylindrical sleeve in a telescopic manner, and a number of balls rotatably mounted in the gap between the shaft and the sleeve. Upon impact, the sleeve and shaft collapse relative to each other, with the balls continuously rolling therebetween to absorb the impact energy.

Although part of the impact energy will be absorbed as described, much of the impact energy will remain unabsorbed and be applied continuously to the vehicle, hence injuring the driver. Furthermore, the structures of those apparatus are complicated and not easy to install or replace.

The invention seeks to mitigate or at least alleviate such problems by providing an improved impact absorber.

SUMMARY OF THE INVENTION

According to the invention, there is provided an impact absorber for vehicle, comprising an outer body including a cavity having an axis and an opening, and an inner body situated partially within the cavity through the opening for relative movement into the cavity along the direction of the axis when the absorber is subject to an impact. The inner body has at least one lateral protrusion. A plurality of deformable units is provided in the outer body at discrete positions along the axial direction. The deformable units partially protrude into the cavity for successive engagements and thus deformations one unit after another unit along the axial direction by the protrusion of the inner body moving relatively into the outer body, thereby absorbing the energy of said impact progressively in different stages.

Preferably, each deformable unit comprises a relatively rigid ball partially protruding into the cavity and a discrete deformable member fixed right behind the ball.

More preferably, the deformable member comprises a plate.

It is preferred that the outer body has a plurality of holes locating the deformable units respectively, each hole having an axis along which the corresponding deformable unit is to deform further into the hole, the hole axis being substantially perpendicular to the cavity axis.

It is further preferred that each hole is a through hole having an inner end from which the corresponding deformable unit partially protrudes into the cavity and an outer end that is closed by a stopper.

It is yet further preferred that the stopper is screwed into the corresponding hole, thereby closing its outer end.

Preferably, each deformable unit comprises a relatively rigid ball partially protruding into the cavity and a discrete deformable member fixed right behind the ball.

In a preferred embodiment, the deformable units are arranged annularly around the cavity and at different positions along the axial direction.

The protrusion may extend annularly around the inner body.

In a specific construction, the outer body comprises a cylinder, and the inner body includes a substantially cylindrical shaft inserted into the cylinder.

The impact absorber may be adapted for use mounted right behind a bumper of a vehicle.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
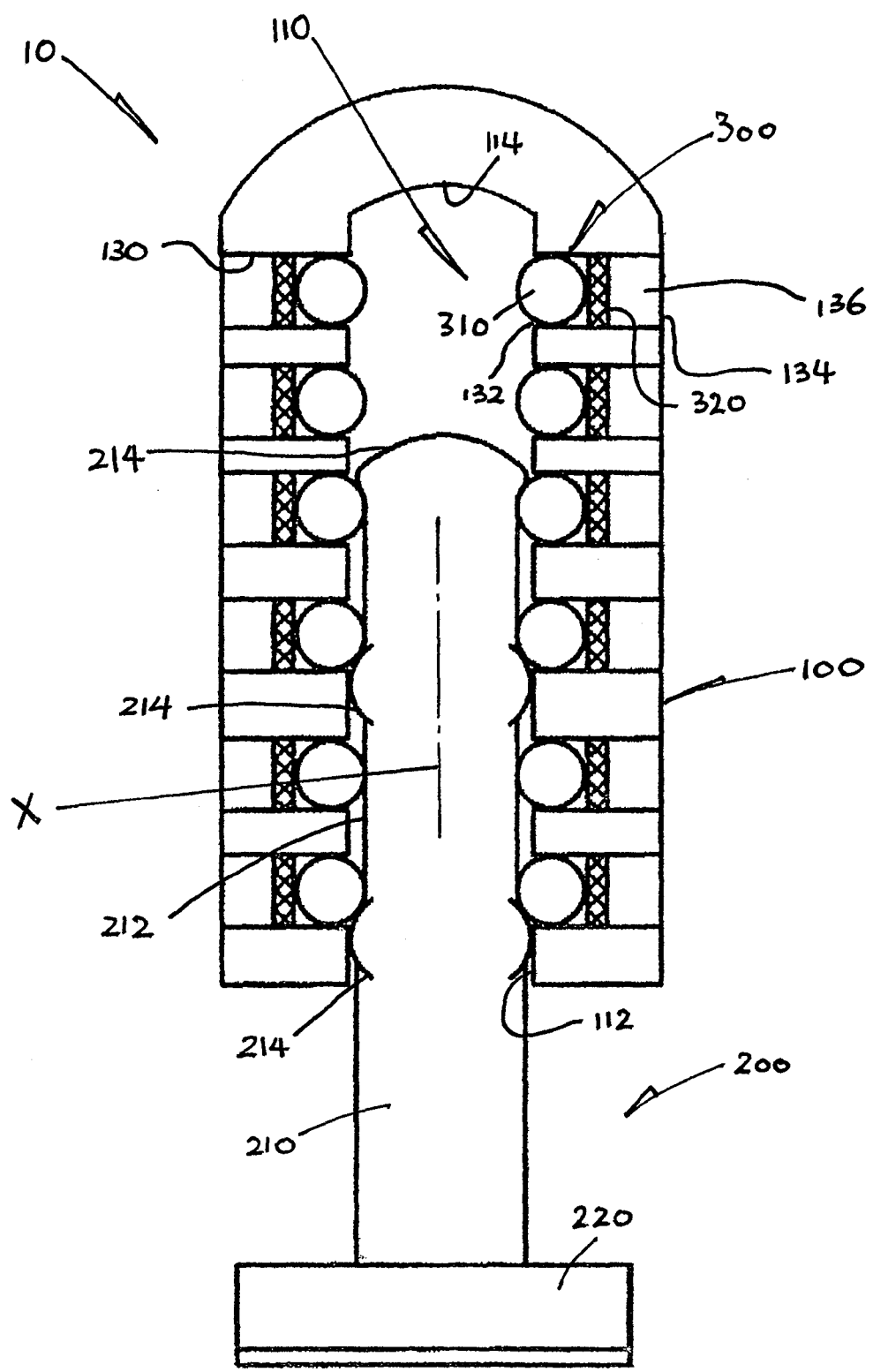
FIG. 1 is a schematic cross-sectional view of an embodiment of an impact absorber in accordance with the invention, which includes a number of deformable units.

Referring to the drawings, there is shown an impact absorber 10 embodying the invention for use in a motor vehicle 20, for example mounted right behind a front bumper 22 thereof, which absorber 10 has an outer cylinder 100, an inner rod 200 and eighteen deformable units 300. The cylinder 100 has a generally cylindrical central cavity 110 that shares a common axis X with the cylinder 100 and has an open end 112 and a closed end 114.

The rod 200 has a shaft 210 having a cylindrical surface 212 and a buffer disc 220 connected co-axially at one of the shaft ends. Three annular ribs 214 are formed on the shaft 210 protruding radially therefrom, which extend around the shaft 210 at evenly spaced positions along the shaft axis. Each rib 214 has a rounded convex cross-section that protrudes slightly from the surface 212 of the shaft 210. The outer diameter of the shaft 210, i.e. including the ribs 214, is marginally smaller than the diameter of the cavity 110.

The shaft 210 is disposed with the other end into the cavity 110 through its open end 112, such that the rod 200 is situated partially within the cylinder 100. The rod 200 is supported by the cylinder 100 for relative movement into the cavity 110 along the direction of axis X, when the absorber 10 is subject to an impact.

Figure 3:
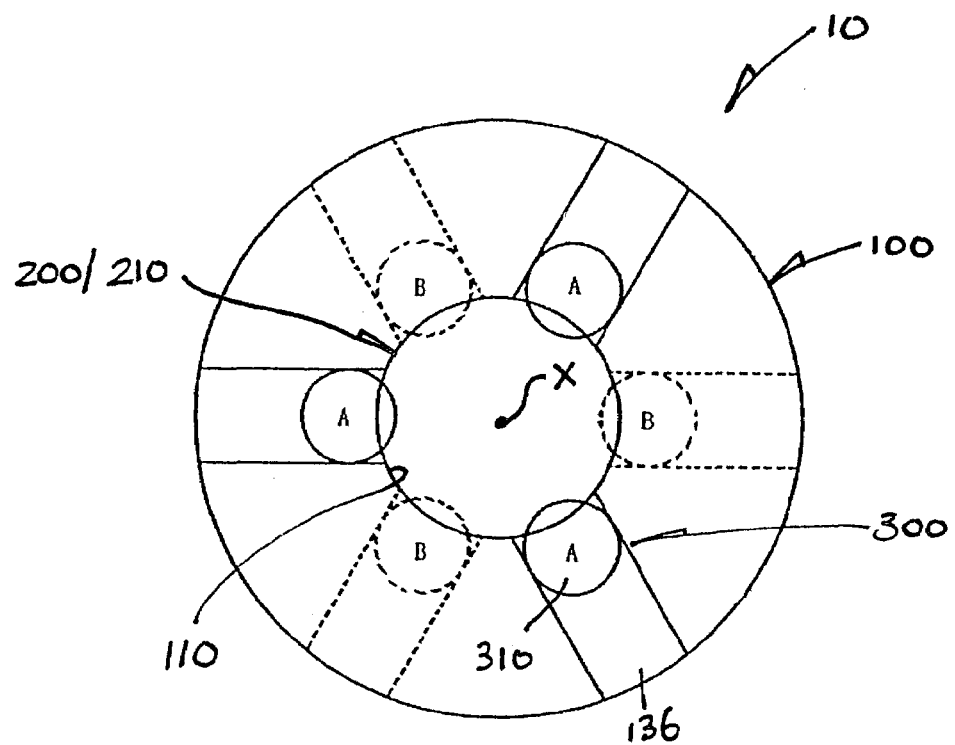
FIG. 3 is an end view of the impact absorber of FIG. 1.

The deformable units 300 are installed in respective holes 130 in the cylinder 100. The holes 130 extend radially with respect to the axis X, being perpendicular thereto, and are arranged in six layers (A to F as shown) at discrete positions and generally at even intervals along the axis X. Each layer consists of three holes 130 that are equiangularly spaced i.e. at an angle of 120° apart (FIG. 3). Adjacent layers of the holes 130 are offset by an angle of 60° such that the holes 130 of alternating layers are angularly aligned.

Figure 2:
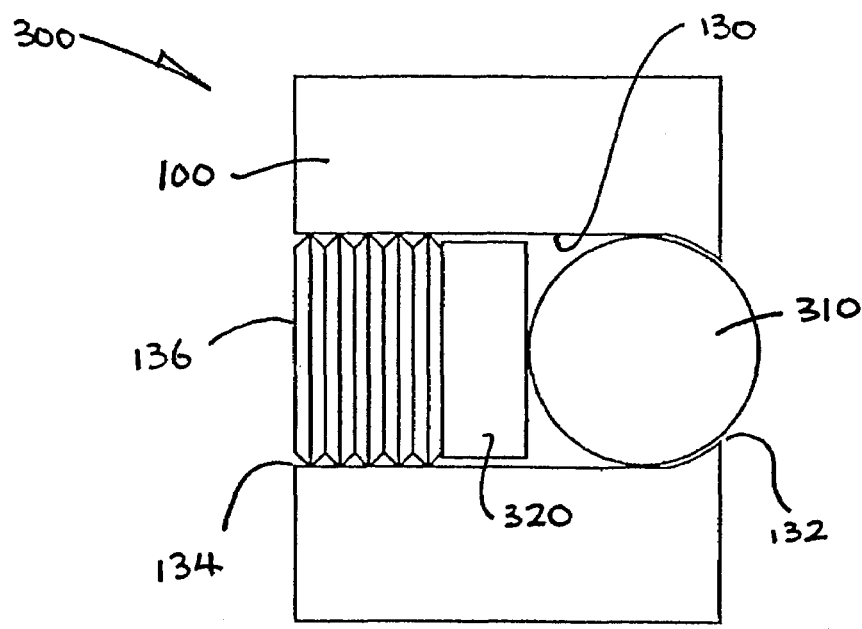
FIG. 2 is a cross-sectional side view of one deformable unit of FIG. 1.

The deformable units 300 have identical construction, i.e. each consisting of a relatively rigid steel ball 310 and a deformable soft metal plate 320 fixed right behind the ball 310 and in abutment therewith. Each hole 130 is initially a through hole, with its inner end 132 slightly restricted to retain the corresponding ball 310, whose outer end 134 is closed by a screwed-in steel stopper 136 (FIG. 2).

The stopper 136 tightens and supports the corresponding plate 320 against the ball 310 from behind, such that the plate 320 will be squashed in and thus deformed by the ball 310 when the ball 310 is forcibly pressed inwards further into the hole 130 (by the shaft 210).

The balls 310 partially protrude from the inner ends 132 of the corresponding holes 130 into the cavity 110, reaching marginally short of or touching the surface 214 of the shaft 210. Given that the ribs 214 protrude from the surface 214 of the shaft 210, the balls 310 normally block the shaft 210 by its ribs 214 against relative inward movement into the cavity 110.

The deformable units 300 are arranged in six discrete layers at regular positions along the axis X, as distinguished by reference numerals 300A to 300F correspondingly. Adjacent ribs 214 are spaced apart by the same distance as the separation across three layers such as between the deformable units 300A and 300C. The cylinder 100 and rod 200 are assembled in the initial condition of FIG. 1, in which the ribs 214 lie from front against the first, third and fifth deformable units 300A, 300C and 300E respectively.

Figure 6:
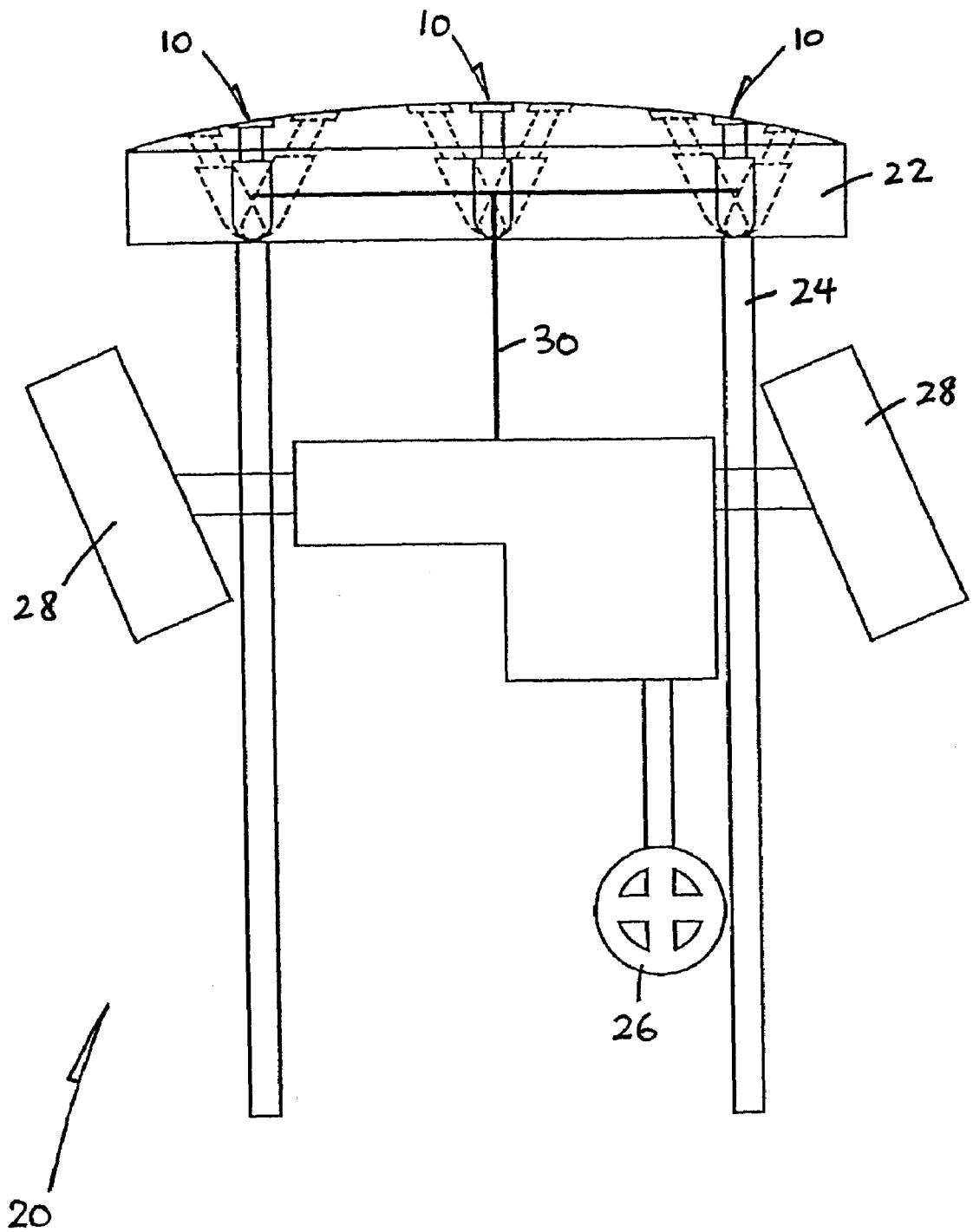
FIG. 6 is a schematic top plan view of the front end of a vehicle incorporating the impact absorber of FIG. 1.

As shown in FIG. 6 where three impact absorbers 10 are in use, each cylinder 100 may be mounted directly on a car chassis 24, with the associated rod 200 pointing forwards right behind the front bumper 22 for receiving an impact in the case of a car accident. The impact absorbers 10 may be coupled by means of a linkage 30 to the steering wheel 26 for pointing generally in the same direction as the front wheels 28, in which direction collision is more likely to occur.

Upon its buffer disc 220 receiving a head-on impart, the rod 200 is rammed into the cylinder 100, whereby the ribs 214 press upon and hence deform the corresponding units 300A, 300C and 300E inwards at right angles through cam actions between the ribs 214 and the associated balls 310. In each of these units 300, deformation occurs mainly at the relatively soft plate 320 as squashed in by the hard ball 310 while being backed by the rigid stopper 136, thereby consuming and thus absorbing at least part of the impact energy in a direction perpendicular to or laterally of the impact.

Upon further movement into the cylinder 100, the rod 200 will not be subject to much resistance as its ribs 214 have not yet reached and come into contact with the respective balls 310 ahead. This period of practically free travel separates the next impact absorption from the preceding stage.

Figure 4:
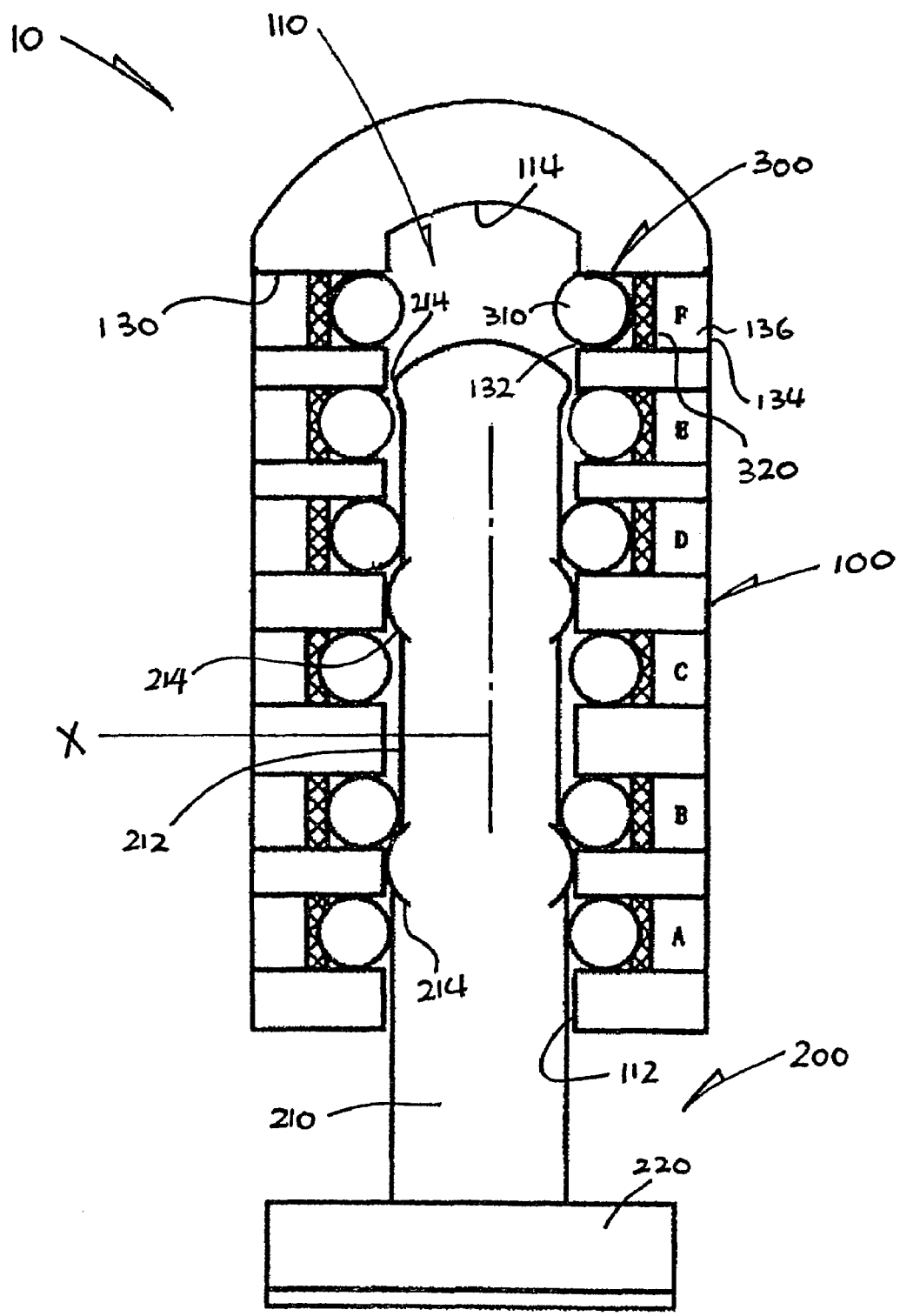
FIG. 4 is a cross-sectional view corresponding to FIG. 1, showing the impact absorber after an initial stage of impact absorption.
Figure 5:
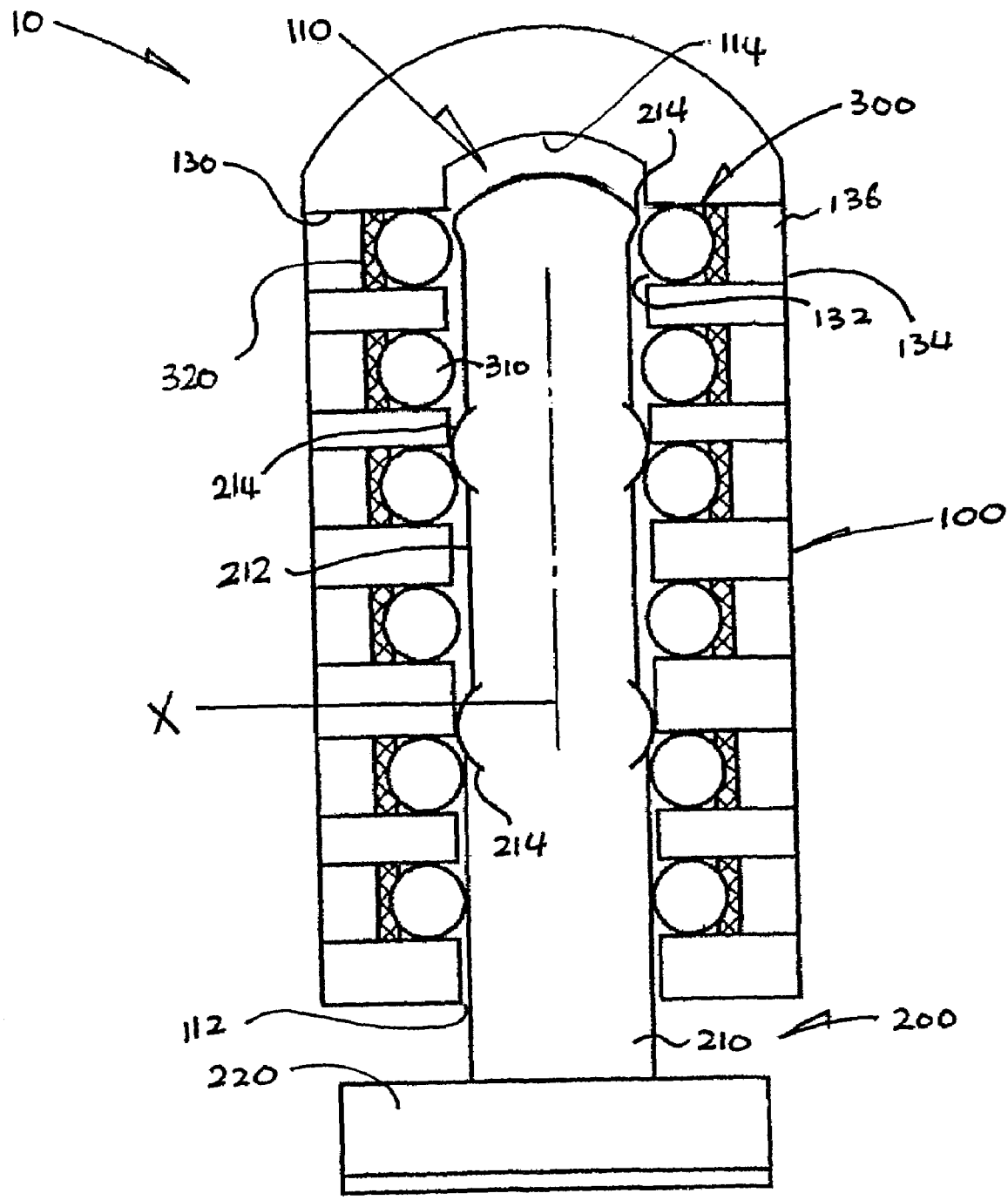
FIG. 5 is a cross-sectional view corresponding to FIG. 4, showing the impact absorber after a subsequent stage of impact absorption.

The subsequent condition is shown in FIG. 4, in which the ribs 214 reach the corresponding next i.e. second, fourth and sixth layer deformable units 300B, 300D and 300F. If the impact is of sufficient magnitude, the rod 200 will be forced further into the cylinder 100 to deform the next set of units 300B, 300D and 300F, thereby further absorbing the impart energy.

In general, the deformable units 300 are arranged in the cylinder 100 for successive deformations one unit after another unit along axis X by the rod 200 when subject to a head-on impact, thereby absorbing the impact energy progressively in two or more different stages.

Progressive handling of the impact energy is effective by dividing the impact force for successive absorptions at distinct intervals as well as lengthening the overall absorption time for power reduction, whereby safety is enhanced.

Given that the impact energy is to be absorbed or dispersed in directions perpendicular to the impact direction, the impact force will be diverted laterally to reduce damage to the vehicle by minimizing the reaction or bounce back force.

After operation, the damaged units 300 can be removed by unscrewing the stoppers 136 and then replaced by new components especially the plates 320.

The invention has been given by way of example only, and various modifications and/or variations to the described embodiments may be made by persons skilled in the art without departing from the scope of the invention as specified in the accompanying claims.

What is claimed is:

1. An impact absorber for a vehicle, comprising:
   an outer body including a cavity having an axis, and an opening;
   an inner body situated partially within the cavity and extending through the opening for relative movement into the cavity along the axis when the absorber is subjected to an impact, the inner body having at least one lateral protrusion transverse to the axis; and
   a plurality of deformable units located in the outer body at discrete positions along the axis, the deformable units partially protruding into the cavity for successive engagements and deformations, one unit after another unit, along the axis, by the protrusion of the inner body moving into the outer body along the axis, thereby absorbing energy of an impact progressively, in different stages, wherein each deformable unit comprises a ball partially protruding into the cavity and a deformable member, softer than the ball, located outwardly from the ball relative to the axis, in a hole in the outer body, the deformable member being deformed upon absorbing the energy of an impact.

2. The impact absorber as claimed in claim 1, wherein the deformable member comprises a plate.

3. The impact absorber as claimed in claim 1, wherein the outer body has a plurality of holes containing respective deformable units, each hole having a hole axis along which the corresponding deformable member deforms, the hole axes being substantially perpendicular to the axis of the cavity.

4. The impact absorber as claimed in claim 3, wherein each hole is a through hole having an inner end from which the corresponding deformable unit partially protrudes into the cavity and an outer end, and further including respective stoppers closing the outer ends of corresponding holes.

5. The impact absorber as claimed in claim 4, wherein each stopper is screwed into the corresponding hole, thereby closing the outer end of the hole.

6. The impact absorber as claimed in claim 1, wherein a plurality of the deformable units are arranged circumferentially around the cavity at each of the discrete positions along the axis.

7. The impact absorber as claimed in claim 6, wherein the plurality of deformable units at one of the discrete positions along the axis are not aligned, along a direction parallel to the axis, with respective deformation units at an adjacent discrete position along the axis.

8. The impact absorber as claimed in claim 1, wherein the protrusion extends annularly around the inner body.

9. The impact absorber as claimed in claim 8, wherein the inner body includes a plurality of annular protrusions.

10. The impact absorber as claimed in claim 1, wherein the outer body comprises a cylinder, and the inner body includes a substantially cylindrical shaft inserted into the cylinder.

11. The impact absorber as claimed in claim 1, adapted for mounting adjacent a bumper of a vehicle.

12. An impact absorber for a vehicle, comprising:
an outer body including a cavity having an axis, and an opening;
an inner body situated partially within the cavity and extending through the opening for relative movement into the cavity along the axis when the absorber is subjected to an impact, the inner body having at least one annular protrusion transverse to the axis; and
a plurality of deformable units located in the outer body at discrete positions along the axis, the deformable units partially protruding into the cavity for successive engagements and deformations, one unit after another unit, along the axis, by the annular protrusion of the inner body moving relatively into the outer body along the axis, thereby absorbing energy of an impact progressively, in different stages, wherein
a plurality of the deformable units are arranged circumferentially around the cavity at each of the discrete positions along the axis, and
the plurality of deformable units at one of the discrete positions along the axis are not aligned, along a direction parallel to the axis, with respective deformation units at an adjacent discrete position along the axis.

13. The impact absorber as claimed in claim 12, wherein each deformable unit comprises a ball partially protruding into the cavity and a deformable plate, softer than the ball, located outwardly from the ball relative to the axis, in a hole in the outer body, the deformable plate being deformed upon absorbing the energy of an impact.

14. The impact absorber as claimed in claim 12, wherein the outer body has a plurality of holes containing respective deformable units, each hole having a hole axis along which the corresponding deformable member deforms, the hole axes being substantially perpendicular to the axis of the cavity.

15. The impact absorber as claimed in claim 12, wherein the inner body includes a plurality of the annular protrusions.

* * * * *